United States Patent [19]

Hasegawa et al.

[11] Patent Number: 4,574,589
[45] Date of Patent: Mar. 11, 1986

[54] EXHAUST PARTICLE REMOVING SYSTEM FOR AN INTERNAL COMBUSTION ENGINE

[75] Inventors: Yoji Hasegawa, Yokohama; Naomi Tokura, Yokosuka, both of Japan

[73] Assignee: Nissan Motor Company, Limited, Yokohama, Japan

[21] Appl. No.: 563,274

[22] Filed: Dec. 19, 1983

[30] Foreign Application Priority Data

Dec. 24, 1982 [JP] Japan ................................ 57-195151

[51] Int. Cl.⁴ ............................................. F01N 3/02
[52] U.S. Cl. ........................................ 60/286; 60/311
[58] Field of Search ........................ 60/274, 286, 311; 73/38, 4 R, 708

[56] References Cited

U.S. PATENT DOCUMENTS

| | | | |
|---|---|---|---|
| 4,383,431 | 5/1983 | Gelernt | 73/4 R |
| 4,424,671 | 1/1984 | Tokura | 60/311 |
| 4,462,208 | 7/1984 | Hicks | 60/311 |

*Primary Examiner*—Douglas Hart

*Attorney, Agent, or Firm*—Lowe, King, Price & Becker

[57] ABSTRACT

An exhaust passage extends from an internal combustion engine to conduct exhaust from the engine. A filter is disposed in the exhaust passage to filter particles out of the exhaust. A burner is disposed in the exhaust passage upstream of the filter to burn off the particles retained by the filter. A sensor senses the pressure across the filter and generates a signal indicative thereof. Another sensor senses an operating condition of the engine. A first device generates a primary reference signal on the basis of the sensed engine operating condition. A second device samples the pressure signal when the pressure sensor is subject to a zero pressure difference. A third device stores the sampled pressure signal. A fourth device corrects the primary reference signal on the basis of the stored pressure signal and generates a secondary reference signal reflecting the correction. A fifth device compares the pressure signal to the secondary reference signal and generates a signal reflecting the result of the comparison. A sixth device activates the burner on the basis of the comparison signal.

6 Claims, 5 Drawing Figures

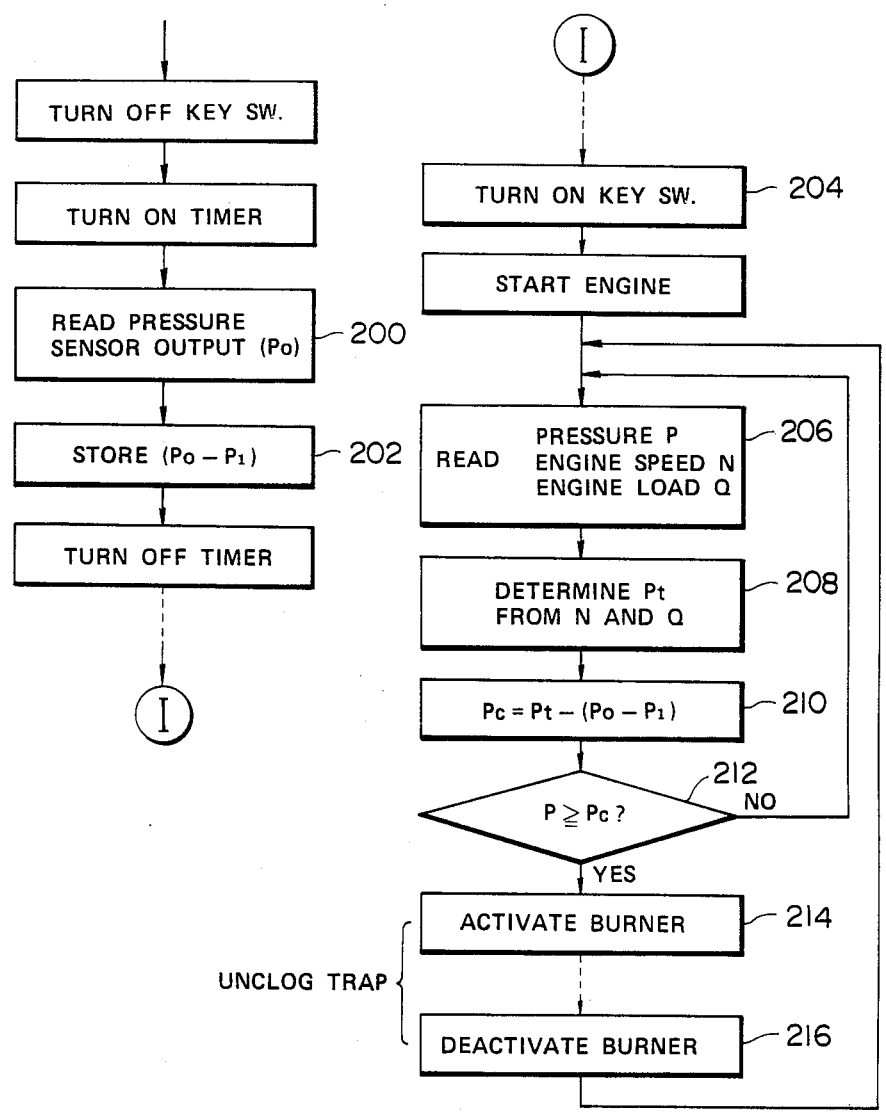

— 1 —

EXHAUST PARTICLE REMOVING SYSTEM FOR AN INTERNAL COMBUSTION ENGINE

BACKGROUND OF THE INVENTION

This invention relates to a system for removing particles from exhaust produced by an internal combustion engine, such as a diesel engine.

Exhaust produced by diesel engines has a relatively high content of polluting particles composed of carbon, unburned fuel, and partially burned fuel. Filters or traps are conventionally disposed in engine exhaust systems to remove the particles from the exhaust. In this case, burners positioned in the exhaust systems upstream of the filters are usually employed to burn off particles deposited on the filters to unclog and rejuvenate the filters.

An exhaust particle removing system including such a filter and a burner has been proposed. This system also includes a pressure sensor which monitors the pressure across the filter as an indication of the degree of clogging of the filter. Furthermore, this system includes a device which determines a pressure reference level on the basis of engine operating conditions, such as engine speed and engine load.

When the monitored pressure exceeds the reference level, fuel supply to the burner is commenced and an igniter of the burner is energized to activate the burner. If ignition of the supplied fuel fails, the operations necessary to activate the burner are repeated. If ignition of the supplied fuel succeeds, activation of the burner is maintained for a preset duration necessary to completely unclog the filter. After this duration, the burner is deactivated. A temperature sensor detects whether the fuel ignition has failed or succeeded by monitoring the temperature difference between positions upstream and downstream of the burner.

Such a conventional exhaust particle removing system can not compensate for variations and tolerances of the characteristics of the pressure sensor resulting from ageing and individual deviations thereof respectively. Accordingly, this system can not accurately determine the pressure across the filter, resulting in commencement of unwanted activation of the burner and/or failure of commencement of necessary activation of the burner, in turn causing unreliable and unacceptable removal of the particles from the exhaust.

SUMMARY OF THE INVENTION

It is an object of this invention to provide an exhaust particle removing system for an internal combustion engine, such as a diesel engine, which can reliably and acceptably remove particles from exhaust produced by the engine.

In accordance with this invention, an exhaust particle removing system for an internal combustion engine includes an exhaust passage, a filter, and a burner. The exhaust passage extends from the engine to conduct exhaust from the engine. The filter is disposed in the exhaust passage to filter particles out of the exhaust. The burner is disposed in the exhaust passage upstream of the filter to burn off the particles retained by the filter. A sensor senses the pressure across the filter and generates a signal indicative thereof. Another sensor senses an operating condition of the engine. A first device generates a primary reference signal on the basis of the sensed engine operating condition. A second device samples the pressure signal when the pressure sensor is subject to a zero pressure difference. A third device stores the sampled pressure signal. A fourth device corrects the primary reference signal on the basis of the stored pressure signal and generates a secondary reference signal reflecting the correction. A fifth device compares the pressure signal to the secondary reference signal and generates a signal reflecting the result of the comparison. A sixth device activates the burner on the basis of the comparison signal.

The above and other objects, features and advantages of this invention will be apparent from the following description of preferred and alternative embodiments thereof, taken in conjunction with the drawings.

BRIEF DESCRIPTION OF THE DRAWINGS

FIG. 5 is a flowchart of operation of a control unit according to a second embodiment of this invention.

DESCRIPTION OF THE PREFERRED EMBODIMENTS

Figure 1:
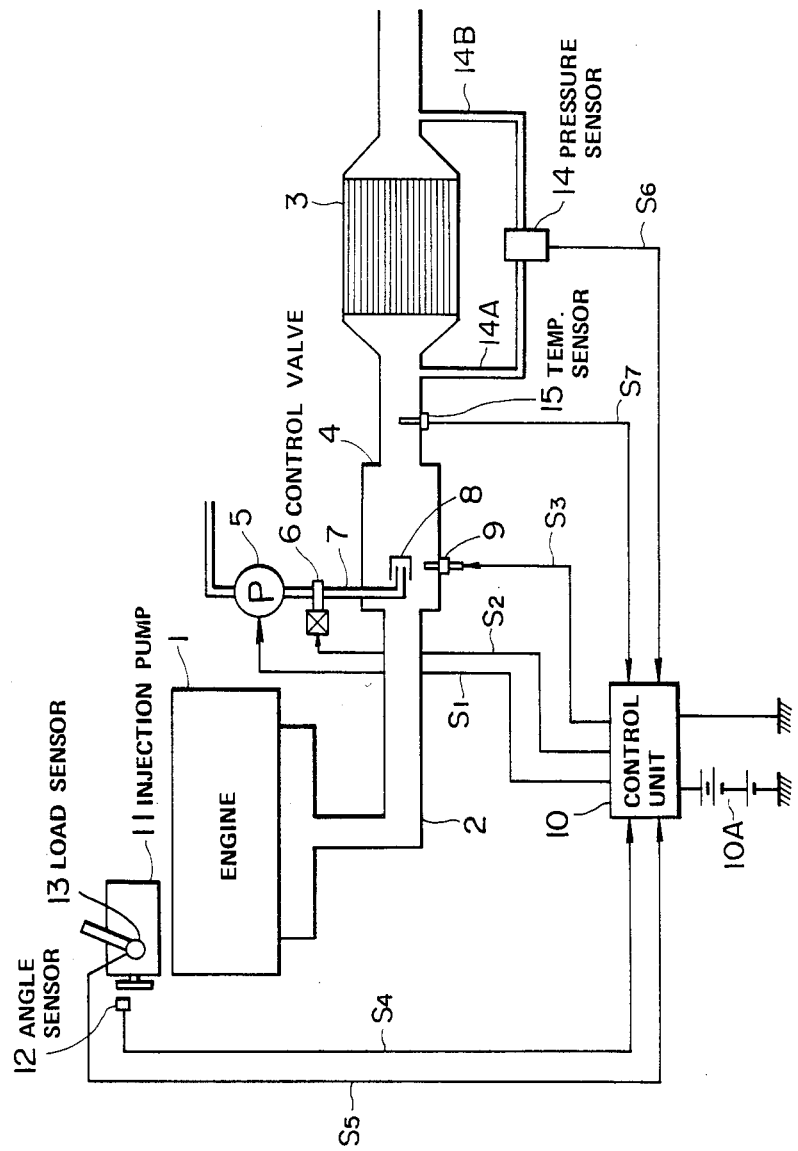
FIG. 1 is a diagram of exhaust particle removing system for an internal combustion engine according to a first embodiment of this invention.

With reference to FIG. 1, a diesel engine 1 is provided with an exhaust passage 2 extending from combustion chambers of the engine 1 to conduct exhaust from the combustion chambers to the atmosphere. A filter or trap 3 is disposed in the exhaust passage 2 to remove polluting particles composed of carbon, unburned fuel, and partially burned fuel from the exhaust. These particles are suspended in the exhaust gas. Specifically, the filter 3 serves to catch or filter out these particles and thereby separate them from the exhaust gas.

A filter unclogging device or burner 4 is disposed in the exhaust passage 2 at a point upstream of the filter 3 to burn off the particles retained and collected by the filter 3 in order to unclog and rejuvenate the filter 3. An electrically-powered fuel pump 5 draws fuel from a fuel tank (not shown) and then drives the fuel toward a burning section 8 of the burner 4 via a fuel passage 7. An electrically-powered control valve 6 is disposed along the fuel passage 7 to selectively block and open the fuel passage 7 to selectively disable and enable the fuel supply to the burner 4.

A mixture of air and fuel may be supplied to the burner 4 in place of the pure fuel. In this case, an air pump supplies air to a mixer disposed in the fuel passage 7. This mixer serves to atomize the fuel and form a mixture of air and fuel, which is supplied to the burner 4.

A heater or igniter 9 is disposed in the burner 4 at a position immediately downstream of the burning section 8 to ignite the fuel injected from the burning section 8 into the burner 4. The resulting burning of the fuel heats the exhaust flowing through the burner 4. The heated exhaust enters the filter 3 and burns off the particles retained by the filter 3. It should be noted that the exhaust includes adequate oxygen to burn the fuel and the particles in the case of a diesel engine.

A control unit 10 is electrically connected to the fuel pump 5, the control valve 6, and the igniter 9 to supply them with control signals S1, S2, and S3, respectively.

A fuel injection pump 11 operative to inject fuel into the combustion chambers of the engine 1 has a drive shaft coupled to the crankshaft of the engine 1. A crank angle sensor 12 is associated with the drive shaft to generate a signal S4 representing the angular position of the crankshaft. Since the signal S4 has a frequency proportional to the rotational speed of the crankshaft, the signal S4 also indicates the speed of the engine 1. The angle sensor 12 is electrically connected to the control unit 10 to supply the engine speed signal S4 to the control unit 10.

The fuel injection pump 11 has a control lever, the position of which determines the rate of fuel supply to the combustion chambers of the engine 1. An engine load sensor 13 is associated with the control lever to generate a signal S5 representing the rate of fuel supply to the engine 1 and in turn the load on the engine 1. The load sensor 13 is electrically connected to the control unit 10 to supply the engine load signal S5 to the control unit 10.

A difference pressure sensor 14 has first and second inlets, which are connected to the exhaust passage 2 at points upstream and downstream of the filter 3 via passages 14A and 14B, respectively. The pressure sensor 14 senses the pressure across the filter 3 and generates a signal S6 indicative thereof. The pressure sensor 14 is electrically connected to the control unit 10 to supply the pressure signal S6 to the control unit 10. Since the pressure across the filter 3 increases with increases in the degree of clogging of the filter 3, the signal S6 indicates the degree of clogging of the filter 3.

The control unit 10 determines a primary reference limit value of the pressure across the filter 3 on the basis of sensed values of the engine speed and load derived from the signals S4 and S5. This primary pressure reference value will be denoted by the character Pt hereafter. The primary pressure reference value Pt varies as a function of the engine speed N and the engine load Q, and is chosen so as to be a reference point for determining whether the degree of clogging of the filter 3 is within or outside of an acceptable range. The control unit 10 determines a secondary pressure reference limit value Pc by correcting the primary pressure reference value Pt. The purpose of this correction will be made apparent later. When the sensed pressure P across the filter 3 represented by the signal S6 exceeds the secondary pressure reference value Pc, the control unit 10 energizes the fuel pump 5 and the igniter 9 and opens the control valve 6 via the control signals S1, S2, and S3 to activate the burner 4. The control unit 10 maintains the energization of the fuel pump 5 and the igniter 9, and the opening of the control valve 6 for a predetermined length of time. The resulting activation of the burner 4 enables the filter 3 to be completely unclogged and rejuvenated. When the sensed pressure P does not exceed the secondary pressure reference value Pc, the control unit 10 keeps the fuel pump 5 and the igniter 9 de-energized and the control valve 6 closed so that the burner 4 remains inactive.

A temperature sensor 15 may be disposed in the exhaust passage 2 at a point upstream of the filter 3 but downstream of the burner 4. The temperature sensor 15 monitors the temperature at that position and generates an electrical signal S7 indicative thereof. The temperature sensor 15 is electrically connected to the control unit 10 to supply the temperature signal S7 to the control unit 10.

On the basis of the temperature of the exhaust passage 2 derived from the signal S7, the control unit 10 determines whether or not the ignition of the fuel in the burner 4 has succeeded. In the case where the temperature of the exhaust passage 2 does not exceed a predetermined reference level after the energization of the igniter 9 starts, i.e., in the case of failure of activation of the burner 4, the control unit 10 repeats the operations necessary to activate the burner 4.

The control unit 10 is electrically connected to a DC source 10A to be powered by the source 10A. The control unit 10 has a microcomputer unit including an input/output circuit, a central processing unit, a readonly memory, and a random-access memory, all mutually interconnected. The control unit 10 operates in accordance with a program stored in the read-only memory.

Figure 2:
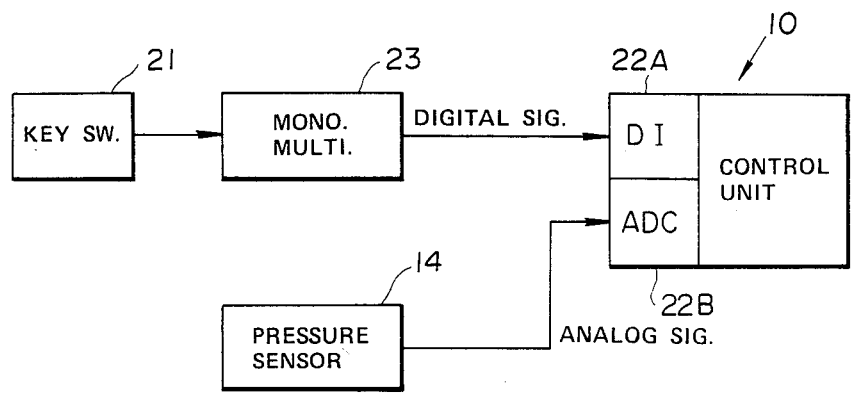
FIG. 2 is a block diagram of the control unit, the pressure sensor of FIG. 1, and an arrangement to sense the closing of an engine key switch.

As shown in FIG. 2, the input/output circuit of the control unit 10 has a digital input section 22A and an analog-to-digital converter 22B. The digital input section 22A is electrically connected to an engine key switch 21 via a monostable multivibrator 23 to receive a digital signal reflecting the closing of the switch 21. The analog-to-digital converter 22B is electrically connected to the pressure sensor 14 to receive the signal S6 which is an analog waveform. The converter 22B transforms the signal S6 into a corresponding digital signal.

Figure 4:
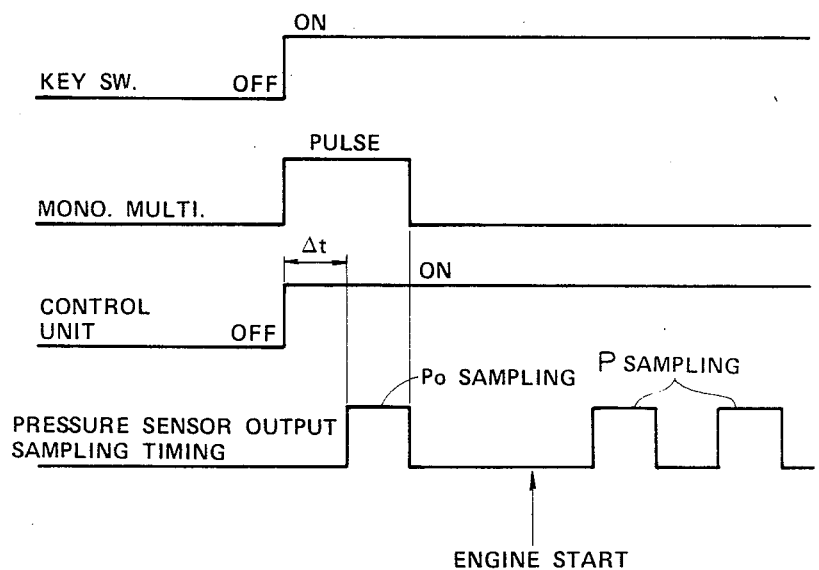
FIG. 4 is a timing diagram of operation of the key switch, the monostable multivibrator, and the control unit of FIG. 2.

As shown in FIG. 4, when the key switch 21 is closed or turned on to start the engine in a normal way, the monostable multivibrator 23 outputs a pulse with a preset duration to the digital input section 22A. Upon the closing of the key switch 21, the control unit 10 is powered or turned on. Note that the key switch 21 is disposed in the electrical connection between the control unit 10 and DC power source 10A, although this arrangement is omitted from FIG. 1. Also the pressure sensor 14 is activated by the power source 10A upon the closing of the key switch 21.

Figure 3:
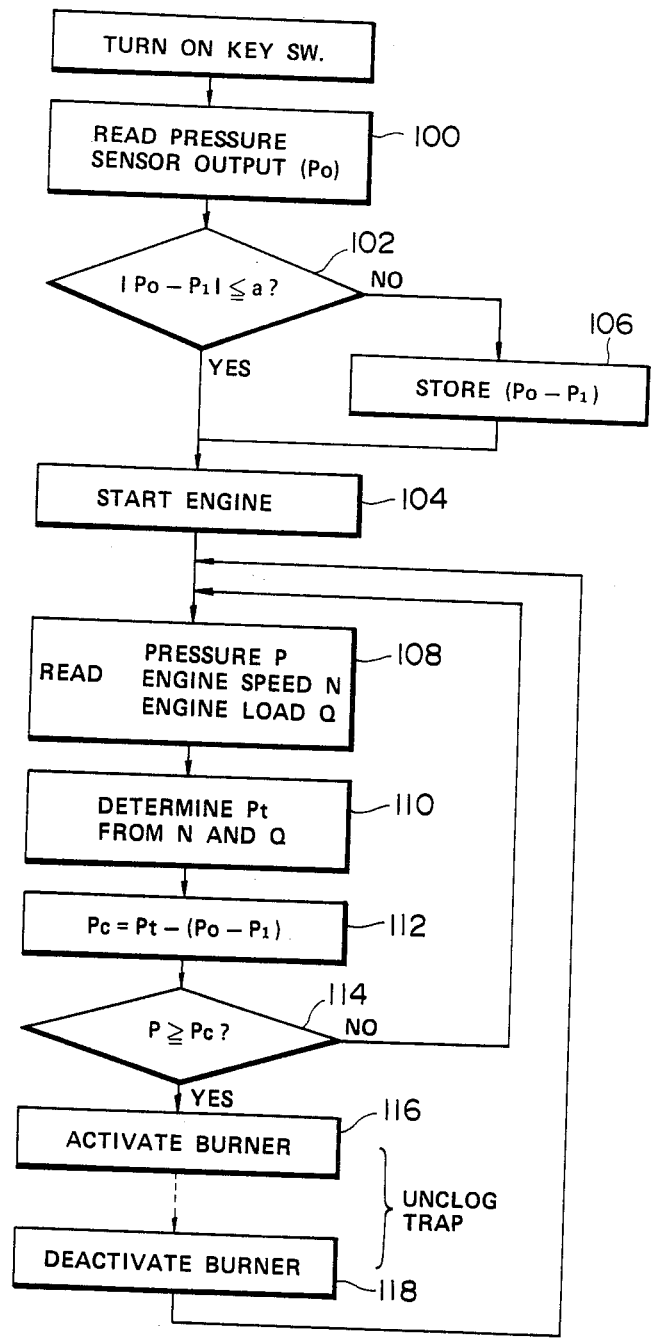
FIG. 3 is a flowchart of operation of the control unit of FIG. 1.

FIG. 3 is a flowchart of operation of the control unit 10. When the key switch 21 is turned on, operation of the control unit 10 is initiated. Specifically, as shown in FIG. 4, the closing of the key switch 21 induces a positive-going voltage change, which is applied to and triggers the monostable multivibrator 23. When triggered, the multivibrator 23 outputs a pulse with the preset duration to the control unit 10. As shown in FIG. 4, during a preset short period starting a preset interval Δt after the leading edge of the pulse from the multivibrator 23, the control unit 10 samples or reads the value Po of the pressure across the filter 3 derived from the output signal S6 of the pressure sensor 14. In FIG. 3, this sampling step is denoted by the reference numeral 100.

During a period of several seconds to several tens of seconds starting from the closing of the key switch 21, a starting motor remains de-energized and glow plugs in the engine combustion chambers remain energized in a conventional way so that the pressure in the exhaust passage 2 continues to be zero. During this period, the control unit 10 samples the pressure value Po as an indication of the initial output level of the pressure sensor 14.

As shown in FIG. 3, in a step 102 subsequent to the step 100, the control unit 10 determines whether or not the absolute value of the initial pressure level Po minus a predetermined reference level $P_1$ is within a predetermined constant a, i.e., whether or not $|Po-P_1| \leq a$. The reference level $P_1$ is chosen so as to represent a typical output of the pressure sensor 14 when subjected to a zero pressure difference. The constant a is chosen to represent allowable error. If the absolute value is within the allowable error a, i.e., when $|Po-P_1| \leq a$, operation of the control unit 10 proceeds to a step 104. If the absolute value is not within the allowable error a, i.e., when $|Po-P_1| > a$, operation of the control unit 10 proceeds to a step 106.

In the step 104, the control unit 10 performs the operations necessary to start the engine, such as activation of the starting motor. In this step 104, the control unit 10 may wait for a signal indicating that the engine has started and proceed to the next step after receiving the start signal.

In the step 106, the control unit 10 stores the value $Po-P_1$, which represents the deviation of the actual output from the typical output of the pressure sensor 14 when subjected to a zero pressure difference. For example, such deviations may result from variations in the output characteristics of the pressure sensor 14 in accordance with its service history or from individual deviations in the output characteristics of the pressure sensor 14. After this step 106, operation of the control unit 10 proceeds to the step 104.

In a step 108 subsequent to the step 104, the control unit 10 samples or reads values of the pressure, the engine speed, and the engine load derived from the signals S6, S4, and S5, respectively. As shown in FIG. 4, the pressure value P is sampled after the engine 1 is started and after the initial pressure value Po is sampled. After the step 108, operation of the control unit 10 proceeds to a step 110.

In the step 110, the control unit 10 determines a primary reference pressure limit Pt on the basis of the engine speed value N and the engine load value Q. Specifically, the read-only memory of the control unit 10 holds a table in which a set of primary reference pressure limits are plotted as a function of the engine speed and the engine load. By referring to this table, the control unit 10 derives the primary reference pressure limit Pt.

After the step 110, operation of the control unit 10 proceeds to a step 112, in which the control unit 10 calculates a secondary reference pressure limit Pc on the basis of the primary reference pressure limit Pt and the previously-stored value of the difference between the initial pressure level Po and the reference level $P_1$. Specifically, the secondary limit Pc is given by a predetermined equation as follows: $Pc = Pt - (Po - P_1)$. In this way, the secondary reference pressure limit Pc results from correction of the primary reference pressure limit Pt on the basis of the deviation value $Po - P_1$.

In a step 114 subsequent to the step 112, the control unit 10 determines whether or not the pressure value P obtained in the previous step 108 is equal to or greater than the secondary reference pressure value Pc, i.e., whether or not $P \geq Pc$. If the pressure value P is equal to or greater than the reference limit Pc, i.e., if $P \geq Pc$, operation of the control unit 10 proceeds to a step 116, in which the control unit 10 performs the actions necessary to activate the burner 4 to unclog the filter 3. If the pressure value P is less than the reference limit Pc, i.e., when $P < Pc$, operation of the control unit 10 returns to the step 108.

As a result, the burner 4 remains de-activated while the pressure value P is less than the reference limit Pc, i.e., while the degree of clogging of the filter 3 is less than a certain level defined by the reference limit Pc. The burner 4 is activated when the pressure value P increases to the reference limit Pc, i.e., when the degree of clogging of the filter 3 reaches the specified level. Since the secondary reference limit Pc results from correction of the primary reference limit Pt on the basis of the deviation of the initial pressure level Po from the reference level $P_1$, it is possible to compensate for variations in the output characteristics of the pressure sensor 14 and individual deviations in the output characteristics of the pressure sensor 14.

After the step 116, operation of the control unit 10 proceeds to a step 118, in which the control unit 10 performs the actions necessary to deactivate the burner 4. After the step 118 is completed, operation of the control unit 10 returns to the step 108.

When the key switch 21 is turned off or opened, the control unit 10 is deactivated so that the deviation value $Po - P_1$ is cleared. The next time the engine 1 is started, a new deviation value $Po - P_1$ is set. This renewal of the deviation value $Po - P_1$ ensures compensation for the above-mentioned variations and deviations in the output characteristics of the pressure sensor 14.

Since energization of the glow plugs in the engine combustion chambers causes a considerable drop in the voltage across the power source 10, it is preferable to power the pressure sensor 14 with a regulated voltage source in order to ensure the accuracy of the pressure sensor 14 in that instance.

The rate of exhaust flow or intake air flow may be sensed in place of sensing the engine speed and engine load in order to determine the primary reference pressure value Pt. In addition, the pressure in the exhaust passage 2 solely on the upstream side of the filter 3 may be sensed in place of sensing the pressure across the filter 3 in order to determine whether or not the filter 3 is clogged.

FIG. 5 is a flowchart of operation of another embodiment of this invention. This embodiment is similar to the previous embodiment except for design changes indicated below. The control unit 10 includes a timer, which is electrically connected to the key switch 21 so as to be triggered when the key switch 21 is turned off or opened. This timer serves to maintain power supply to the control unit 10 and the pressure sensor 14 for a predetermined period starting from the opening of the key switch 21.

As shown in FIG. 5, the timer is turned on or activated when the key switch 21 is turned off or opened. As a result, power supply to the control unit 10 and the pressure sensor 14 is maintained for the predetermined period. During this period, the control unit 10 samples or reads the value Po of the output S6 from the pressure sensor 14 in a step 200. Since the opening of the key switch 21 is performed upon stop of the engine 1, the pressure value Po represents the output from the pressure sensor 14 when subjected to a zero pressure difference. When the control unit 10 samples the pressure value Po, the glow plugs in the engine combustion chambers are not energized by the power source 10A so that activation of the pressure sensor 14 by the power source 10A is adequately stable. This stable activation of the sensor 14 ensures acceptable accuracy of the sampled pressure value Po even in the case where the pressure sensor 14 is not powered by a regulated voltage source.

In a step 202 subsequent to the step 200, the control unit 10 stores a deviation value $Po-P_1$, where $P_1$ is a predetermined reference value. This storage of the deviation value $Po-P_1$ is backed up by an internal power source in the control unit 10. After the deviation value $Po-P_1$ has been stored, the timer is turned off or deactivated.

The next time the engine 1 is started, the control unit 10 performs the actions necessary to start the engine 1 at a step 204 after the key switch 21 is turned on or closed. This step 204 is similar to the step 104 of FIG. 3.

In a step 206 subsequent to the step 204, the control unit 10 samples or reads a pressure value P, an engine speed value N, and an engine load value Q derived from the signals S6, S4, and S5, respectively. This step 206 is similar to the step 108 of FIG. 3.

After the step 206, operation of the control unit 10 proceeds to a step 208, in which the control unit 10 determines a primary reference pressure limit Pt on the basis of the engine speed value N and the engine load value Q. This step 208 is designed in a manner similar to that of the step 110 of FIG. 3.

In a step 210 subsequent to the step 208, the control unit 10 calculates a secondary reference pressure limit Pc by means of a predetermined equation $Pc=Pt-(P-P_1)$. The deviation value $Po-P_1$ is determined in the previous step 202. This step 210 is designed in a manner similar to that of the step 112 of FIG. 3.

In a step 212 subsequent to the step 210, the control unit 10 determines whether or not $P \leq Pc$, where P is the pressure value derived in the step 206 an Pc is the secondary reference limit derived in the step 210. This step 212 is similar to the step 114 of FIG. 3. When $P \leq Pc$, operation of the control unit 10 proceeds to a step 214. When $P < Pc$, operation of the control unit 10 returns to the step 206.

In a step 214, the control unit 10 performs the actions necessary to activate the burner 4 to unclog the filter 3. This step 214 is similar to the step 116 of FIG. 3.

In a step 216 subsequent to the step 214, the control unit 10 performs the actions necessary to deactivate the burner 4. This step 216 is similar to the step 118 of FIG. 3. After the step 216, operation of the control unit 10 returns to the step 206.

The reference pressure value need not be corrected on the basis of the deviation value $Po-P_1$ provided that the sampled pressure value P is corrected on the basis of the deviation value $Po-P_1$.

What is claimed is:

1. An exhaust particle removing system for an internal combustion engine, comprising:
   (a) an exhaust passage extending from the engine for conducting exhaust from the engine;
   (b) a filter disposed in the exhaust passage for filtering particles out of the exhaust;
   (c) a burner disposed in the exhaust passage at a point upstream of the filter for burning off the particles retained by the filter;
   (d) a pressure sensor for sensing the pressure across the filter and generating a signal indicative thereof;
   (e) an engine condition sensor for sensing an operating condition of the engine and generating a signal indicative thereof;
   (f) means for generating a primary reference signal on the basis of the engine operating condition signal;
   (g) means for sampling the pressure signal when the pressure sensor is subject to a zero pressure difference;
   (h) means for storing the sampled pressure signal;
   (i) means for correcting the primary reference signal on the basis of the stored pressure signal and generating a secondary reference signal reflecting the correction;
   (j) means for comparing the pressure signal to the secondary reference signal and generating a signal reflecting the result of the comparison; and
   (k) means for activating the burner on the basis of the comparison signal.

2. An exhaust particle removing system as recited claim 1, wherein the sampling means includes an engine key switch and means for sensing the closing of the key switch and generating a signal indicative thereof, the sampling means being responsive to the key switch signal for performing the sampling operation after the key switch is closed but before the engine is started.

3. An exhaust particle removing system as recited in claim 1, wherein the sampling means includes an engine key switch and means for sensing the opening of the key switch and generating a signal indicative thereof, the sampling means being responsive to the key switch signal for performing the sampling operation after the key switch is opened.

4. An exhaust particle removing system as recited in claim 3, further comprising a timer for activating the pressure sensor for a predetermined peiod starting from the opening of the key switch.

5. An exhaust particle removing system for an internal combustion engine, comprising:
   (a) an exhaust passage extending from the engine for conducting exhaust from the engine;
   (b) a filter disposed in the exhaust passage for filtering particles out of the exhaust;
   (c) a burner disposed in the exhaust passage at a point upstream of the filter for burning off the particles retained by the filter;
   (d) a pressure sensor for sensing a pressure difference between points upstream and downstream of the filter and generating a signal indicative thereof;
   (e) an engine condition sensor for sensing an operating condition of the engine and generating a signal indicative thereof;
   (f) means for generating a primary reference signal on the basis of the engine operating condition signal;
   (g) means for sampling the pressure signal when the pressure sensor is subject to a zero pressure difference;
   (h) means for storing the sampled pressure signal;
   (i) means for correcting the primary reference signal on the basis of the stored pressure signal and generating a secondary reference signal reflecting the correction;
   (j) means for comparing the pressure signal to the secondary reference signal and generating a signal reflecting the result of the comparision; and
   (k) means for activating the burner on the basis of the comparision signal.

6. In an exhaust particle removing system for an internal combustion engine including:
   (a) an exhaust passage extending from the engine for conducting exhaust from the engine;
   (b) a filter disposed in the exhaust passage for filtering particles out of the exhaust;

(c) a burner disposed in the exhaust passage at a point upstream of the filter for burning off the particles retained by the filter;
(d) a pressure sensor for sensing the pressure across the filter and generating a signal indicative thereof;
(e) an engine condition sensor for sensing an operating condition of the engine and generating a signal indicative thereof;
(f) means for generating a primary reference signal on the basis of the engine operating condition signal; and
(g) means for activating said burner when said pressure sensor signal exceeds said primary reference signal,
the improvement comprising:

means for compensating signals generated by said pressure sensor for individual characteristics of said pressure sensor and for variation of such individual characteristics from expected values therefor, including first means for determining a zero pressure differential output signal from said pressure sensor;

second means for comparing said zero pressure differential output signal with an expected value therefor; and third means for correcting said primary reference signal by a difference between said zero pressure differential output signal and said expected value therefor when said difference exceeds a predetermined value.

* * * * *